(12) United States Patent
Lee

(10) Patent No.: US 12,013,052 B1
(45) Date of Patent: Jun. 18, 2024

(54) VALVE ASSEMBLY FOR GAS VESSEL

(71) Applicant: YOUNGDO IND. CO., LTD., Busan (KR)

(72) Inventor: Kwang Ho Lee, Busan (KR)

(73) Assignee: YOUNGDO IND. CO., LTD., Busan (KR)

( * ) Notice: Subject to any disclaimer, the term of this patent is extended or adjusted under 35 U.S.C. 154(b) by 0 days.

(21) Appl. No.: 18/085,381

(22) Filed: Dec. 20, 2022

(51) Int. Cl.
- *F16K 31/24* (2006.01)
- *F16K 15/18* (2006.01)
- *F16K 31/26* (2006.01)

(52) U.S. Cl.
CPC ............ *F16K 31/26* (2013.01); *F16K 15/184* (2021.08); *F16K 31/24* (2013.01)

(58) Field of Classification Search
CPC .. F17C 13/04; F17C 2205/0332; F16K 31/26; F16K 1/30; F16K 1/304; F16K 1/14; F16K 31/22; F16K 31/24; F16K 31/28
See application file for complete search history.

(56) References Cited

U.S. PATENT DOCUMENTS

| | | | | |
|---|---|---|---|---|
| 6,810,905 B1* | 11/2004 | Watson | ................... | F16K 21/18 |
| | | | | 137/449 |
| 7,219,686 B2* | 5/2007 | Schmitz | ................... | F16K 1/305 |
| | | | | 73/317 |
| 8,550,111 B2* | 10/2013 | Home | ................. | F16K 37/0008 |
| | | | | 73/317 |
| 10,989,360 B2* | 4/2021 | Daniels | ................. | F16K 31/265 |
| 2008/0078467 A1* | 4/2008 | Home | ................. | F16K 37/0041 |
| | | | | 141/95 |

FOREIGN PATENT DOCUMENTS

KR  100317171  12/2001

* cited by examiner

*Primary Examiner* — Hailey K. Do
(74) *Attorney, Agent, or Firm* — CANTOR COLBURN LLP

(57) ABSTRACT

Provided is a valve assembly for a gas vessel including: a valve body mounted at an inlet of the gas vessel and connected to a gas supply source; a connection part connected to the gas supply source on a side surface of the valve body; a check valve mounted on the connection part; and a safety valve mounted on the side surface of the valve body to discharge a fuel gas in the gas vessel to the outside when a gas pressure inside the gas vessel increases above a certain pressure or higher. The valve assembly for a gas vessel is connected to the lower end of the valve body and arranged in the gas vessel to block the gas passage when the fuel gas introduced through the valve body is charged to a set value to prevent overcharging of the fuel gas.

4 Claims, 8 Drawing Sheets

VALVE ASSEMBLY FOR GAS VESSEL

TECHNICAL FIELD

The present invention relates to a valve assembly for a gas vessel, and more particularly, to a valve assembly for a gas vessel, in which the valve assembly is mounted on the gas vessel which stores compressed gas or liquefied gas so as to have a function of preventing overcharge of the fuel gas.

BACKGROUND ART

In general, in a device using a fuel gas, such as liquefied petroleum gas (LPG), liquefied natural gas (LNG), compressed natural gas (CNG), etc., the fuel gas should be recharged into a gas vessel once the fuel gas stored in the gas vessel is exhausted.

When the fuel gas is charged in the gas vessel, an overcharge prevention device is installed in a valve assembly installed in the gas vessel to prevent explosion due to overcharging.

As disclosed in Korean Patent Registration Publication No. 10-0317171 (on Nov. 28, 2001), the conventional overcharge prevention device includes: a float floating when the liquid surface of the liquid gas rises; a cam connected to the float and rotating when the float rises: a level control valve coming in contact with the cam to open and close a passage while being ascended and descended by the cam; and a sealing packing mounted on the level control valve to be in close contact with the passage.

In the conventional overcharge prevention device, the sealing packing mounted on the level control valve is in close contact with the passage to seal the passage. However, the sealing packing is maintained in a state of being in close contact with the passage by an elastic force of a spring, but there is a problem in that as time elapses, the sealing packing is deformed, or the overcharge prevention function may not be performed due to corrosion.

Technical Problem

Therefore, an objective of the present invention is to provide a valve assembly for a gas vessel having an overcharge prevention function with excellent reliability by allowing the opening and closing of a gas passage to be performed by a ball member.

Another objective of the present invention is to provide a valve assembly for a gas vessel capable of accurately implementing an overcharge prevention function by improving an opening and closing structure of a gas passage.

Another object of the present invention is to provide a valve assembly for a gas vessel, in which a gauge is mounted on a valve body to display a charging amount of a fuel gas filled in the gas vessel, and an elevating action of a float is transferred to the gauge by a magnetic force of a permanent magnet to facilitate assembly and reduce the number of components, by making it convenient to install the gauge.

Technical Solution

According to an aspect of the present invention, there is provided a valve assembly for a gas vessel including: a housing mounted on a valve body mounted on the gas vessel and having a gas passage through which a fuel gas passes and an outlet for discharging the fuel gas to the inside of the gas vessel; a flux valve mounted to be sealably and linearly movable inside the housing to open and close the outlet, and having a through portion, formed at a center thereof, through which the fuel gas passes: a seat member that is sealably mounted on a lower side of the housing and has a passage part through which the fuel gas passes: a ball member mounted inside the seat member to open and close the passage portion: and a push unit mounted on a lower side of the seat member to push the ball member to maintain an opened state of the passage portion, and to release a pushing force of the ball member when the fuel gas is filled in the gas vessel to allow the ball member to seal the passage portion.

The housing may have a first seat part formed to block the gas passage when a flux valve is in close contact on an upper inner surface thereof, and the flux valve may have a contact ring mounted to contact the first seat part on an upper outer surface thereof.

The seat member may be hermetically mounted on an inner surface of a lower side of the housing, and have a second seat part formed to be in close contact with the ball member on the inner surface thereof.

The push unit may include: a support member connected to the seat member; a push rod inserted into the support member to be able to move linearly, maintaining a constant gap with an inner surface of the support member to allow the fuel gas to pass therethrough, and pushing the ball member through the passage portion: a float floating by buoyancy when the fuel gas is filled in the gas vessel: and a power transmission unit transferring the movement of the float to the push rod to linearly move the push rod.

When the push rod is lowered, the ball member is in close contact with the second seat part formed on the seat member, and the ball member may maintain a state in which the ball member is in close contact with the second seat part by pressure of fuel gas introduced into the seat member.

The power transmission unit may employ a cam member which is hinge-connected to a lower end of the support member, is in contact with a lower end of the push rod, and is connected to the float so as to be rotated according to the elevation of the float, to allow the push rod to linearly move.

The cam member may include a convex part contacting a lower end of the push rod when the float is in a lowered state, and a concave part contacting a lower end of the push rod when the float is in an elevated state.

The power transmission unit may include: a pinion gear rotatably mounted on the lower end of the support member and connected to the float so as to rotate according to the elevation of the float: and a rack gear connected to the lower end of the push rod and engaged with the pinion gear.

A gauge unit for displaying a charging amount of the fuel gas filled in the gas vessel is mounted on the valve body, and the gauge unit includes: a elevating rod which is arranged to be able to move up and down on the push unit and moves together according to the elevation of the float: and a gauge which is mounted on the valve body and displays the charging amount of the fuel gas charged in the gas vessel by rotating a gauge needle according to the movement of the elevating rod.

The elevating rod is placed to linearly move on the support member, and the lower end of the elevating rod is connected to the power transmission unit, and a permanent magnet for operating the gauge by magnetic force is mounted on the upper end of the elevating rod.

Advantageous Effects

As described above, the valve assembly for a gas vessel according to the present invention allows the opening and closing of a gas passage by a ball member, thereby preventing a decrease in reliability over time.

In addition, according to the valve assembly for a gas vessel of the present invention, the opening and closing structure of the gas passage may be improved to accurately prevent overcharging.

In addition, according to the valve assembly for a gas vessel of this invention, a gauge is mounted on a valve body to display the amount of fuel gas charged in the gas vessel, and the lifting action of the float is transmitted to the gauge by magnetic force of a permanent magnet, making it easy to install the gauge and assemble parts and reduce the number of parts.

DETAILED DESCRIPTION OF THE INVENTION

Hereinafter, embodiments of the present invention will be described in detail with reference to the accompanying drawings.

Figure 1:
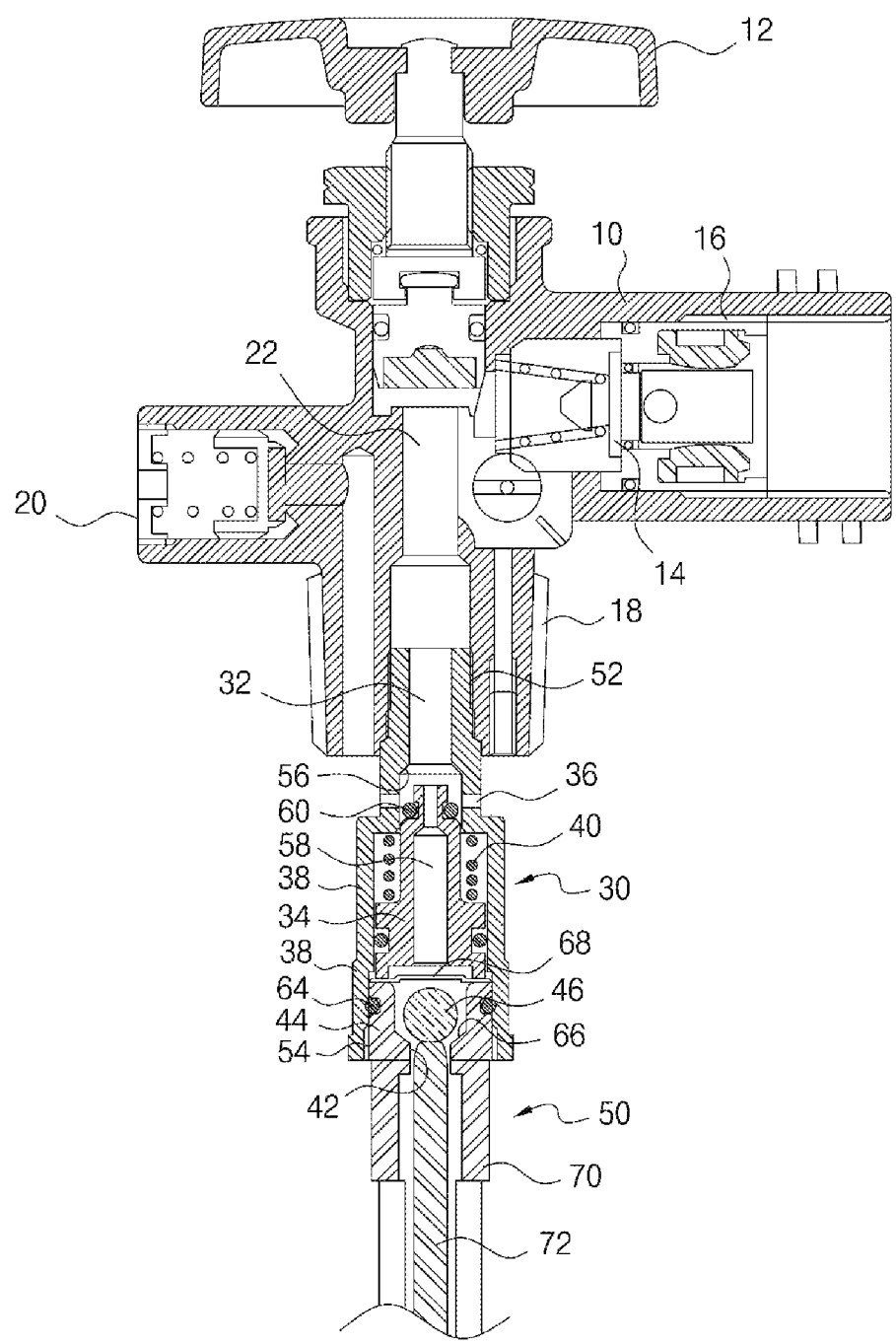
FIG. 1 is a cross-sectional view illustrating a valve assembly for a gas vessel according to an embodiment of the present invention.
Figure 2:
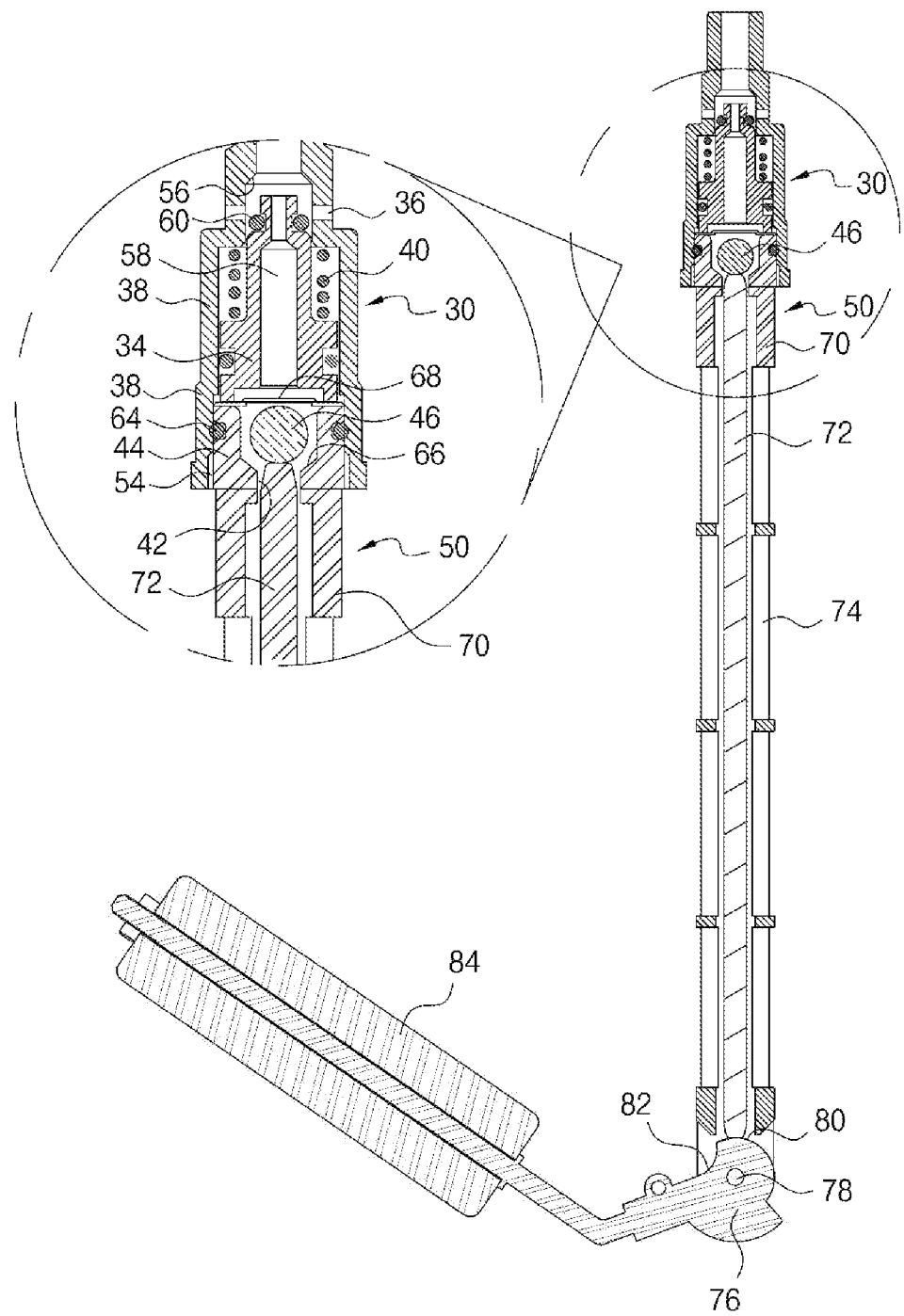
FIG. 2 is a cross-sectional view illustrating an overcharge prevention device in a valve assembly for a gas vessel according to an embodiment of the present invention.

FIG. 1 is a cross-sectional view illustrating a valve assembly for a gas vessel according to an embodiment of the present invention, and FIG. 2 is a cross-sectional view illustrating an overcharge prevention device in the valve assembly for a gas vessel of FIG. 1.

As shown in FIG. 1, the valve assembly for a gas vessel according to an embodiment of the present invention includes: a valve body 10 mounted at an inlet of the gas vessel and connected to a gas supply source: a handle 12 rotatably mounted on an upper side of the valve body 10 to manually supply or shut off a fuel gas by a user; and an overcharge prevention device 30 that is connected to a lower end of the valve body 10 and arranged in the gas vessel to inject or discharge a fuel gas flowing through an inlet channel 22 of the valve body 10 in or out of the gas vessel and blocks a gas passage 32 to prevent an overcharge of the fuel gas when the fuel gas is charged to a set value.

A connection part 16 connected to a gas supply source is formed on a side surface of the valve body 10, a check valve 14 is mounted on the connection part 16, and a screw part 18 for coupling with a gas vessel is formed outside a lower end of the valve body 10.

When the gas is charged into the gas vessel, the check valve 14 is opened according to the gas pressure, and the gas inside the gas vessel is prevented from being discharged to the outside. However, when the gas inside the gas vessel is to be discharged to the outside, the gas inside the gas vessel may be discharged to the outside by opening the check valve after coupling a regulator to be connected to the check valve.

In addition, a safety valve 20 is mounted on the side surface of the valve body 10 to discharge a fuel gas in the gas vessel to the outside when a gas pressure inside the gas vessel increases above a certain pressure or higher.

As shown in FIG. 2, in the valve assembly for a gas vessel according to the present invention, the overcharge prevention device 30 includes: a housing 38 screw-coupled on a lower side of the valve 10 and having a gas passage 32 communicating with an inlet channel 22 through which a fuel gas passes and through which the fuel gas passes and an outlet 36 formed on a side surface of the housing to discharge the fuel gas: a flux valve 34 mounted to be sealably and linearly movable inside the housing 38 to open and close the outlet 36; a spring 40 installed between the flux valve 34 and the housing 38 to provide an elastic force to the flux valve 34; a seat member 44 that is sealably mounted on a lower side of the housing 38 and has a passage part 42 through which the fuel gas passes; a ball member 46 mounted inside the seat member 44 to open and close the passage part 42; and a push unit 50 mounted on a lower side of the seat member 44 to push the ball member 46 to maintain an opened state of the passage part 42, and to release a pushing force of the ball member 46 when the fuel gas is filled in the gas vessel to allow the ball member 46 to seal the passage part 42.

A first screw 52 is formed on an upper outer surface of the housing 38 and is screwed to a lower side of the valve body 10, and a second screw 54 is formed on a lower inner surface of the housing 38 to screw the seat member 44. In addition, a first seat part 56 is formed on an upper inner surface of the housing 38, which blocks the gas passage 32 to block the fuel gas from being discharged to the outlet 36.

The flux valve 34 is mounted to move linearly while being in close contact with an inner surface of the housing 38, and includes: a through part 58 through which a fuel gas passes and formed in the center thereof; and a contact ring 60 that is in close contact with the first seat part 56 of the housing 38 and mounted on an upper outer surface thereof.

The flux valve 34 maintains a state lowered by the elastic force of the spring 40 to allow the fuel gas to pass through the gas passage 32 and the outlet 36, and when the flux valve 34 overcomes the elastic force of the spring 40 and rises, the contact ring 60 is closely attached to the first seat part 56 to block the gas passage 32.

The seat member 44 is screwed to a second screw 54 formed on a lower side of the housing 38, a sealing 64 is mounted with respect to the housing 38 to be mounted to be sealable on the housing 38, and a second seat part 66 is formed on the passage part 42 of the seat member 44 to seal the passage part when the ball member is in close contact.

In addition, between the seat member 44 and the flux valve 34, a plate member 68 that divides between the flux valve 34 and the seat member 44 is mounted together with the flux valve 34.

In this way, since the ball member 46 is arranged on the seat member 44 and the passage part 42 is opened and closed by the ball member 46, the problem of deterioration in reliability due to long-term use may be solved.

The push unit 50 includes: a support member 70 connected to the seat member 44 and penetrating the center: a push rod 72 inserted into the support member 70 to be linearly move to push the ball member 46; a float 84 floating by buoyancy when the fuel gas is filled in the gas vessel: and a power transmission unit that transfers the movement of the float 84 to the push rod 72 to move the push rod 72 linearly.

The support member 70 and the push rod 72 are formed to maintain a certain interval so that the fuel gas may pass, and when the push rod 72 passes through the passage part 42 and pushes the ball member 46, the fuel gas passes between the push rod 72 and the passage part 42. An opening 74 is formed in the support member 70 so that the fuel gas passes in the circumferential direction.

The length of the support member 70 may be adjusted according to the level of the gas vessel.

As shown in FIG. 2 according to a first embodiment, the power transmission unit employs a cam member 76 which is hinged to a lower end of the support member 70, is in contact with a lower end of the push rod 72, and is connected to the float, to rotate the push rod 72 to linearly move according to the elevation of the float.

The cam member 76 is rotatably mounted at a lower end of the support member 70 by a hinge shaft 78, and includes a convex part 80 for raising the push rod 72 and a concave part 82 for lowering the push rod 72. A float 84 is connected to the cam member 76 and, as shown in FIG. 2, when the float 84 is lowered, the convex part 80 contacts the push rod 72 to raise the push rod 72, and the push rod 72 pushes the ball member 46 to keep the passage part 42 to be in an open state.

Figure 3:
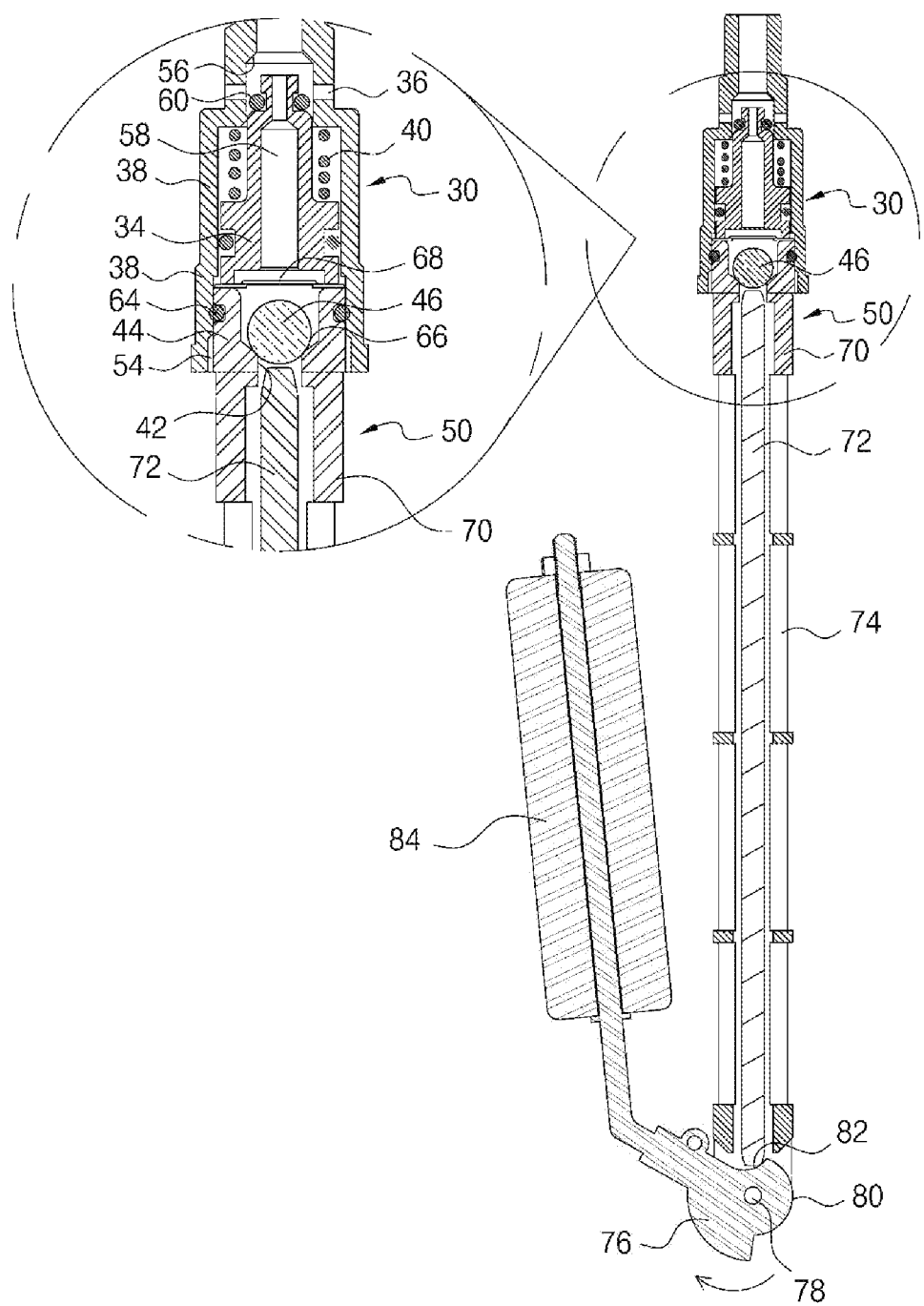
FIG. 3 is a diagram illustrating an operation state of an overcharge prevention device in a valve assembly for a gas vessel according to an embodiment of the present invention.

In addition, as shown in FIG. 3, when the gas vessel is charged with fuel gas, the float 84 floats and rotates the cam member 76 and thus the concave part 82 of the cam member 76 contacts a lower end of the push rod 72 to lower the push rod 72, releasing the force of the push rod 72 pushing the ball member 46 and lowering the ball member 46 to close the passage part 42.

Figure 4:
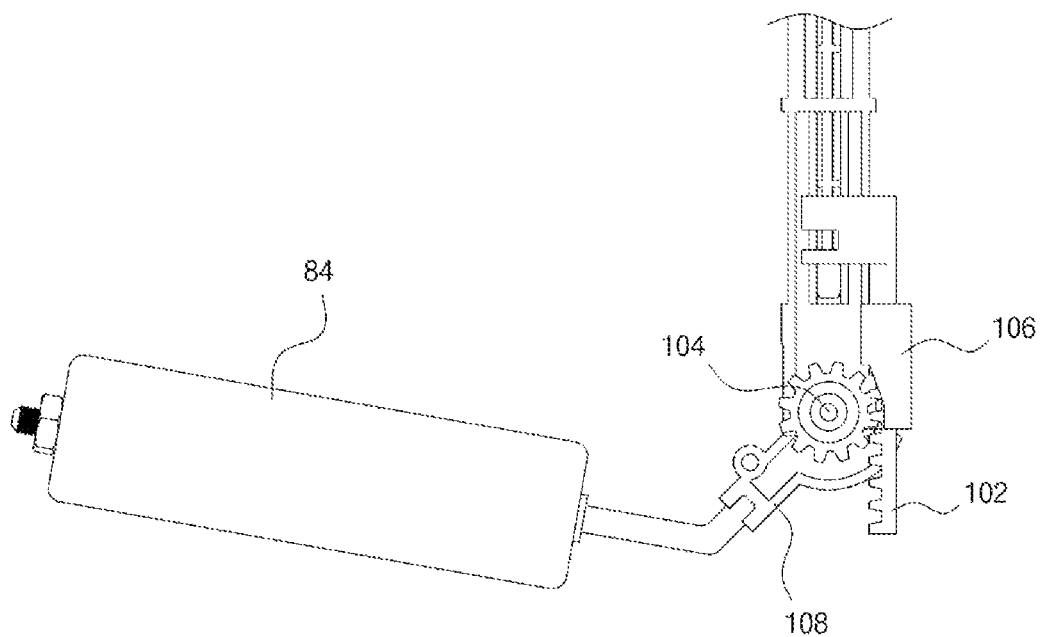
FIG. 4 is a side view illustrating a power transmission unit of an overcharge prevention device in a valve assembly for a gas vessel according to a second embodiment of the present invention.

As shown in FIG. 4, the power transmission unit according to ta second embodiment includes a pinion gear 104 rotatably mounted on the lower end of the support member 70 and connected to the float 84 to rotate according to the elevation of the float 84, and a rack gear 102 connected to the lower end of the push rod 72 and gear-engaged with the pinion gear 104.

The pinion gear 10) is connected to the float 84 by a first connection part 108 and rotates when the float 84 rises and falls, and the rack gear 102 is connected to the lower end of the push rod 72 by a second connection part 106 to linearly move to allow the push rod 72 to linearly move when the pinion gear 104 rotates.

Figure 5:
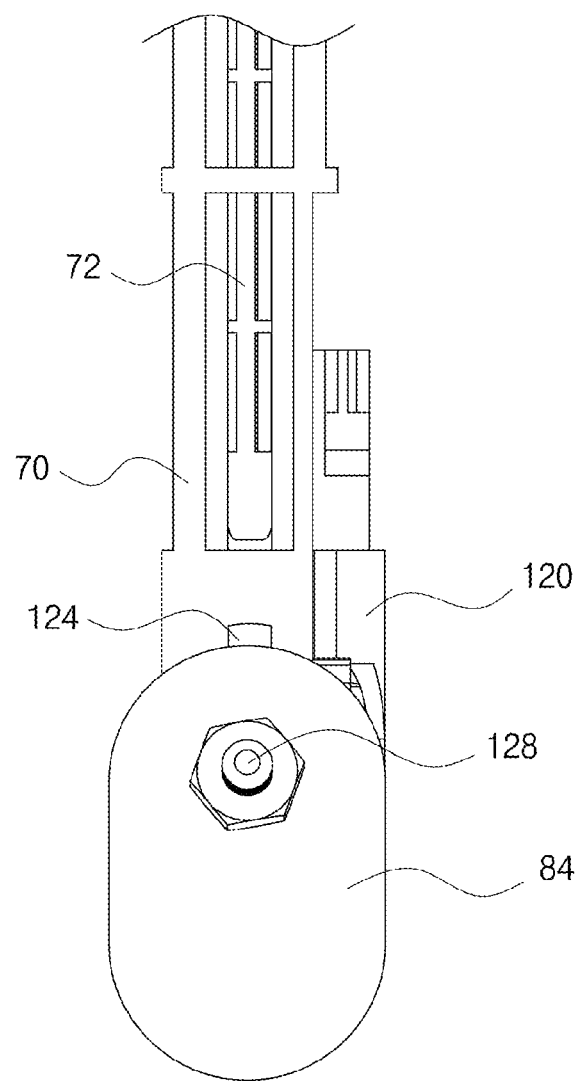
FIG. 5 is a side view illustrating a power transmission unit of an overcharge prevention device in a valve assembly for a gas vessel according to a third embodiment of the present invention.

As shown in FIG. 5, the power transmission unit according to a third embodiment includes: a slot 124 formed longitudinally under the support member 70; a rod part 128 inserted into the slot, to move linearly along the slot, and fixed to the float; and a connection member 120 connected between the float 84 and the push rod 72 to transfer the movement of the float 84 to the push rod 72. The power transmission unit according to the third embodiment has a simple structure since the float 84 is mounted directly on the support member 70 to slidably move and connected to the push rod 72.

An operation of an overcharge prevention device constituting the valve assembly for a gas vessel according to the present invention configured as described above will be described.

When a fuel gas is introduced through the inlet channel 22 of the valve body 10, the fuel gas is introduced into the gas vessel through the outlet 36 through the gas passage 32 of the housing 38. In this case, the flux valve 34 is maintained in a lowered state by the elastic force of the spring. The fuel gas introduced into the gas passage 32 passes through the through part 58 of the flux valve 34 and is discharged through the passage part 42 of the seat member 44. In this case, the ball member 46 is pushed by the push rod 72 so that the passage part 42 is opened, and the fuel gas passes through the passage part 42.

In this state, the fuel gas is charged in the gas vessel, and when the level of the fuel gas reaches a set level, as shown in FIG. 3, the float 84 floats by buoyancy and rotates the cam member 76. As a result, the lower end of the push rod 72 comes into contact with the concave part 82 of the cam member 76 to lower the push rod 72, and the ball member 46 is in close contact with the second seat part 66 to block the passage part 42. As illustrated in FIG. 4, the pressure of the fuel gas inside the seat member 44 increases, the pressure of the fuel gas acts on the lower surface of the flux valve 34, and the flux valve 34 overcomes the elastic force of the spring 40 and rises to be in close contact with the second seat part 56 to block the gas passage 32.

Then, the supply of the fuel gas into the gas vessel is cut off, thereby preventing overcharging of the gas vessel.

Figure 6:
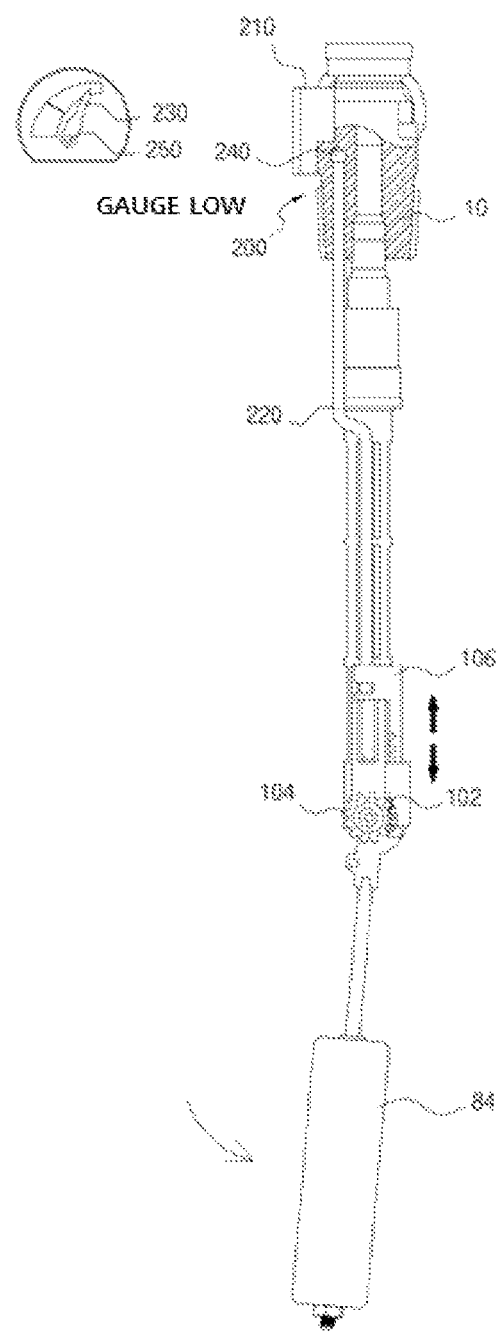
FIG. 6 is a cross-sectional view illustrating an overcharge prevention device on which a gauge unit is mounted in a valve assembly for a gas vessel according to a fourth embodiment of the present invention.

FIG. 6 is a cross-sectional view of an overcharge prevention device of a valve assembly for a gas vessel according to a fourth embodiment of the present invention.

The overcharge prevention device according to the fourth embodiment is the same as the overcharge prevention device described in the above embodiment, and a gauge unit 200 capable of checking the amount of fuel gas charged is additionally installed.

The gauge unit 200 includes a elevating rod 220 arranged to vertically move on the support member 70 and connected to the push unit (50) at the bottom thereof to ascend together according to the elevation of the float 84, and a gauge 210 mounted on the valve body 10 to display the amount of fuel gas charged in the gas vessel visually by rotating the gauge needle according to the movement of the elevating rod 210.

The elevating rod 220 is connected, at a lower end thereof, to a power transmission unit for transmitting the elevation of the float to the push rod. As an example, the elevating rod 220 is connected to the rack gear 102 described in the second embodiment. In addition, the lower end of the elevating rod 220 may be connected to the push rod 72 in addition to the rack gear 102, may be moved together when the push rod 72 moves in a straight line, may be connected to the cam member 76 described in the first embodiment, and may be connected to the connection member 120 described in the third embodiment.

The gauge needle 230 is rotatably installed in the gauge 210. A metal member 250 to which a magnetic force of a permanent magnet is applied is mounted on the gauge needle 230. The permanent magnet 240 is mounted on an upper end of the elevating rod 220. Therefore, when the elevating rod 220 is lifted, the permanent magnet 240 applies the magnetic force to the metal member 250 to move the gauge needle 230 to display the amount of charge.

Here, the elevating rod 220 and the gauge 210 are not directly connected with each other, and are operated by the magnetic force of the permanent magnet 240. Thus, when installing the gauge 210, it is unnecessary to connect the gauge 210 and the elevating rod 220. Therefore, it is easy and convenient to attach and detach the gauge 210. In addition, the number of components may be reduced, and processing due to leakage of the gauge is unnecessary, thereby reducing processing work.

Figure 7:
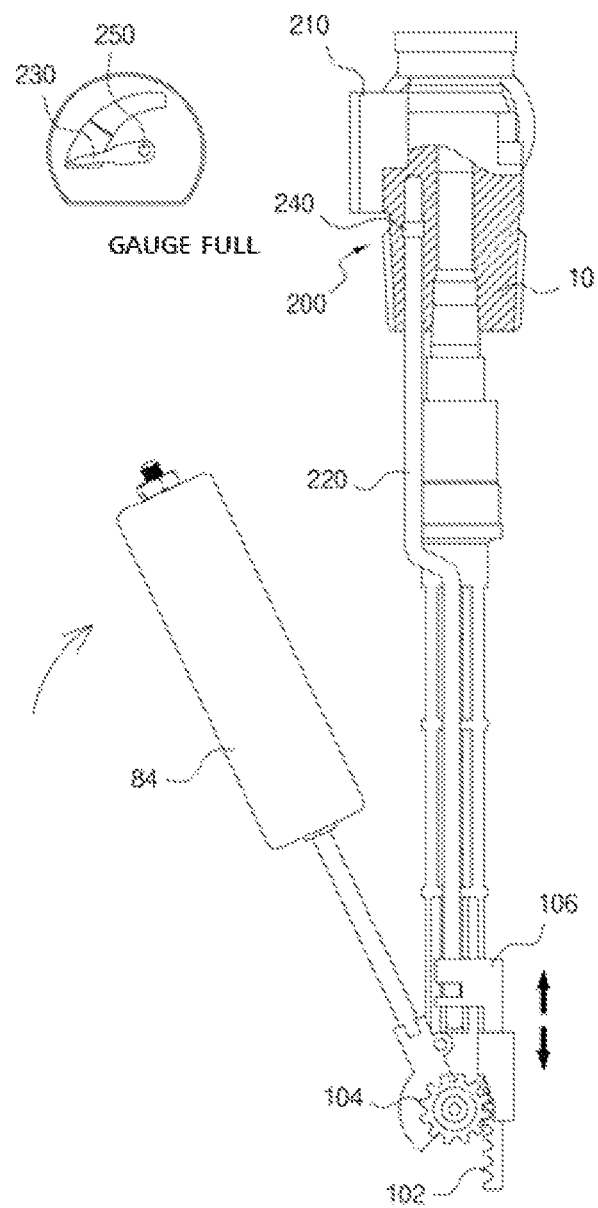
FIG. 7 is a diagram illustrating an operation state of a gauge unit in a valve assembly for a gas vessel according to a fourth embodiment of the present invention.

FIG. 7 is a diagram illustrating an operation state of a gauge unit according to a fourth embodiment of the present invention.

As shown in FIG. 6, when reviewing the operation of the gauge unit 200, in the case that the gas vessel is not filled with the fuel gas, the float 84 is lowered, and the lift rod 220 is raised, and the gauge needle 230 is displayed as gauge LOW by the magnetic force of the permanent magnet 240 mounted on the upper end of the elevating rod 220.

In addition, as shown in FIG. 7, when the gas vessel is charged with the fuel gas, the float 84 rises, and when the elevating rod 220 descends, the gauge needle 230 is displayed as gauge FULL by the magnetic force of the permanent magnet 240 mounted at the end of the elevating rod 220.

Figure 8:
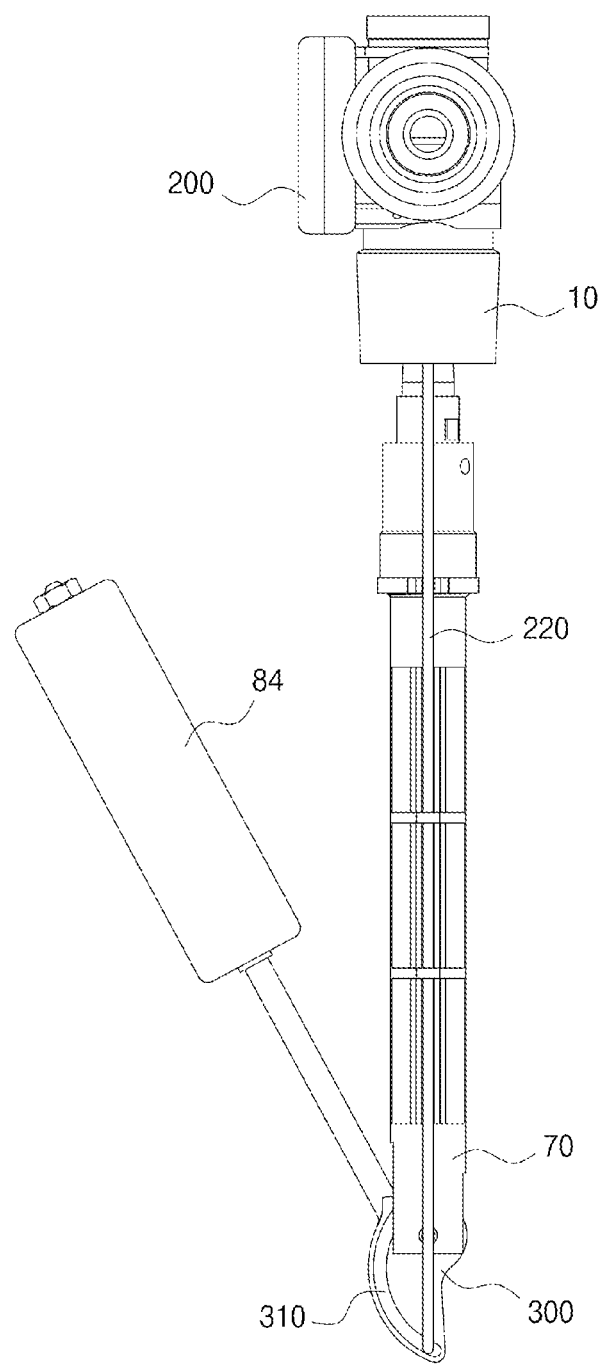
FIG. 8 is a diagram illustrating an overcharge prevention device on which a gauge unit is mounted in a valve assembly for a gas vessel according to a fifth embodiment of the present invention.

FIG. 8 is a diagram illustrating an overcharge prevention device on which a gauge unit is mounted in a valve assembly for a gas vessel according to a fifth embodiment of the present invention.

The gauge unit according to the fifth embodiment has the same structure as the gauge unit according to the fourth embodiment, but has a different structure of a power transmission unit for transmitting power. That is, the power transmission unit according to the fifth embodiment includes a hinge member 300 connected to the float 84 and rotatably mounted on the lower end of the support member 70, and a slot part 310 formed as an arc-shaped groove in the hinge member 300 and into which the lower end of the elevating rod 220 is inserted.

In the gauge unit according to the fifth embodiment, when the float 84 is moved in the vertical direction, the hinge member 300 rotates together with the float 84, and the elevating rod inserted into the slot part formed in the float 84 moves along the slot part 310 and moves up and down.

While the present invention has been particularly shown and described with reference to exemplary embodiments thereof, by way of illustration and example only, it is clearly understood that the present invention is not to be construed as limiting the present invention, and various changes and modifications may be made by those skilled in the art within the protective scope of the invention without departing off the spirit of the present invention.

What is claimed is:

1. A valve assembly for a gas vessel, the valve assembly comprising:
   a valve body mounted at an inlet of the gas vessel and connected to a gas supply source;
   a connection part connected to the gas supply source on a side surface of the valve body;
   a check valve mounted on the connection part;
   a safety valve mounted on the side surface of the valve body to discharge a fuel gas in the gas vessel to an outside when a gas pressure inside the gas vessel increases above a certain pressure or higher;
   a housing mounted on the valve body mounted on the gas vessel and having a gas passage through which the fuel gas passes and an outlet for discharging the fuel gas to an inside of the gas vessel;
   a flux valve mounted to be sealably and linearly movable inside the housing to open and close the outlet and having a through portion formed at a center thereof, the fuel gas passing through the through portion;
   a seat member sealably mounted on a lower side of the housing and having a passage part through which the fuel gas passes;
   a ball member mounted inside the seat member to open and close the passage part;
   a push unit mounted on a lower side of the seat member to push the ball member to maintain an opened state of the passage part, and to release a pushing force of the ball member when the fuel gas is filled to a set value in the gas vessel to allow the ball member to seal the passage part; and
   a gauge unit that is mounted on the valve body to display a charging amount of the fuel gas filled in the gas vessel,
   wherein the push unit comprises: a support member connected to the seat member;
   a push rod inserted into the support member to be able to move linearly, maintaining a constant gap with an inner surface of the support member to allow the fuel gas to pass therethrough, and pushing the ball member through the passage part;
   a float floating by buoyancy when the fuel gas is filled in the gas vessel; and
   a power transmission unit including: a slot formed longitudinally in the support member; a rod part inserted into the slot, and fixed to the float, the rod part moving linearly along the slot; and a connection member connected between the float and the push rod to transmit a movement of the float to the push rod thereby transferring the movement of the float to the push rod to linearly move the push rod, and
   wherein the gauge unit comprises: an elevating rod arranged to be able to move up and down on the push unit and moving together according to an elevation of the float; a gauge mounted on the valve body and displaying a charging amount of the fuel gas charged in the gas vessel by rotating a gauge needle according to a movement of the elevating rod; and a permanent magnet mounted on an upper end of the elevating rod to rotate the gauge needle by a magnetic force.

2. The valve assembly for a gas vessel of claim 1, wherein the housing comprises a first seat part formed to block the gas passage when the flux valve is in close contact on an upper inner surface thereof, and the flux valve comprises a contact ring mounted to contact the first seat part on an upper outer surface thereof.

3. The valve assembly for a gas vessel of claim 1, wherein,
   the seat member is hermetically mounted on an inner surface of the lower side of the housing, and comprises a second seat part formed to be in close contact with the ball member on an inner surface of the seat member.

4. The valve assembly for a gas vessel of claim 3, wherein, when the push rod is lowered, the ball member is in close contact with the second seat part formed on the seat member, and maintains a state in which the ball member is in close contact with the second seat part by a pressure of the fuel gas introduced into the seat member.

* * * * *